United States Patent
Nicolas

[11] 3,909,603
[45] Sept. 30, 1975

[54] METHOD OF PROCESSING PRODUCTION WELL LOGGING DATA

[75] Inventor: Yves Nicolas, Versailles, France

[73] Assignee: Schlumberger Technology Corporation, New York, N.Y.

[22] Filed: Aug. 11, 1971

[21] Appl. No.: 170,806

[30] Foreign Application Priority Data
Aug. 12, 1970 France .............................. 70.29635

[52] U.S. Cl.......... 235/151.34; 235/92 FL; 324/11; 444/1
[51] Int. Cl.[2]...................... G06F 15/20; G06G 7/57
[58] Field of Search.......... 444/1; 73/194 R, 61.1 R; 324/11; 235/92 FL, 151.34

[56] References Cited
UNITED STATES PATENTS

| | | | |
|---|---|---|---|
| 3,304,766 | 2/1967 | Hubby .............................. | 73/61.1 |
| 3,385,108 | 5/1968 | Rosso................................ | 73/194 |
| 3,488,996 | 1/1970 | Pfrehm .............................. | 73/61.1 |
| 3,545,270 | 12/1970 | Chang................................ | 73/194 |

OTHER PUBLICATIONS
Curtis, M. R., *Flow Analysis in Producing Wells*, Paper No. SPE-1908, Society of Petroleum Engineers of AIME, 1967.

*Primary Examiner*—R. Stephen Dildine, Jr.
*Attorney, Agent, or Firm*—Cooper, Dunham, Clark, Griffin & Moran

[57] ABSTRACT

In accordance with an illustrative embodiment of the present invention, a method is disclosed for processing production logging data in order to determine, in a two-phase, water-oil, flow, the flowrate of one of the phases at different depths of a production well. At each depth, data representative of the total flowrate and of the proportion of total cross section of pipe occupied by one of the phases, designated "hold up," is generated. For each depth, the slippage velocity between the two phases is computed from the data representative of hold up and of a parameter which is a function of the difference in density between the two phases. The flowrate of each phase is then computed from the previously computed values of slippage velocity and from the data representative of total flowrate and hold-up. This method gives precise quantitative data making it possible to determine the operations required to improve the production of the well.

20 Claims, 8 Drawing Figures

INVENTOR.
Yves Nicolas

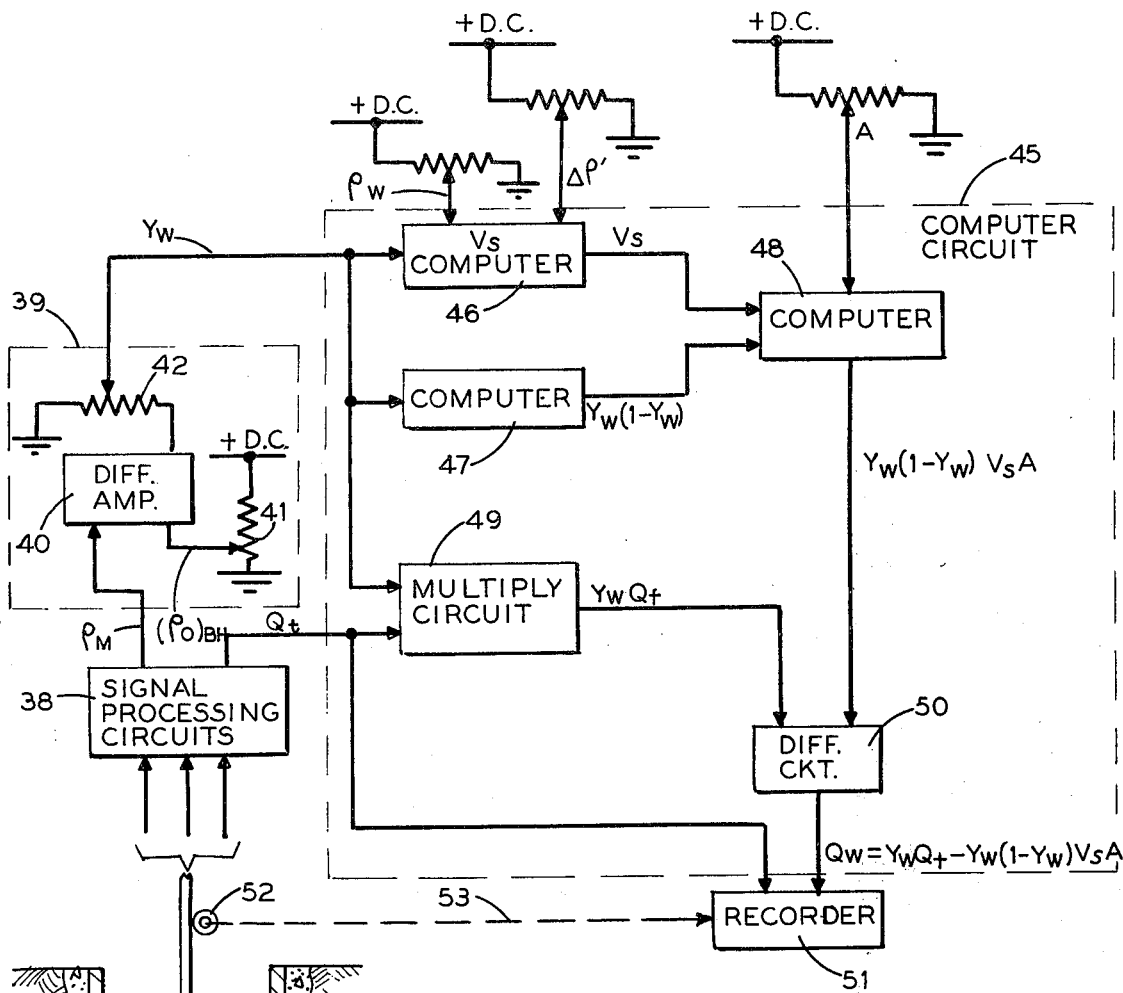
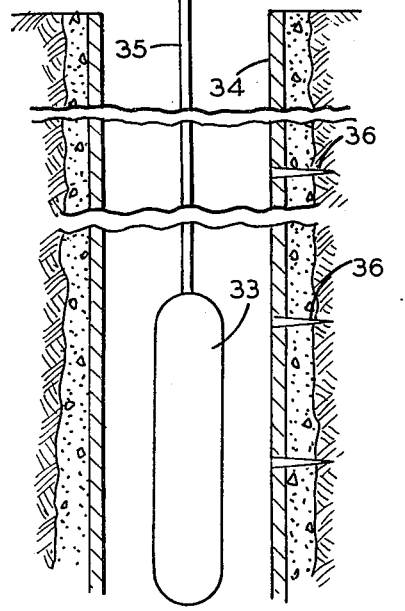

METHOD OF PROCESSING PRODUCTION WELL LOGGING DATA

This invention relates to a method for the processing of production logging data and more particularly to a method making it possible to determine the flowrate of each phase of a multiple-phase flow in a production well.

After a wellbore is drilled in the earth, and sufficient quantities of easily removable oil and/or gas are found, the well is cased and cemented, and perforated at desired depths to produce (bring to the surface) the oil and/or gas. Production logging concerns the measurement of parameters useful in evaluating the well after completion, and particularly, for evaluating the nature and movement of fluids within the well.

The fluid flowing in a production well is generally a mixture of several phases, water, gas and oil, coming from the different producing layers. One of the purposes of production logging is to determine, at different levels of a production well, the nature and the quantity of the phases in the flowing fluid. To accomplish this in the case of two-phase flows, a conventional method is to measure at each of these levels, the total flowrate of the fluid and also the hold-up of each phase. Total flowrate is the instantaneous flow of all fluids within the well and will vary from one depth level to another since most wells are perforated at a number of depth levels thus causing fluid to enter the well at a number of levels. "Hold up" is the proportion of the total cross section of a well occupied by a given phase. Thus, there can be water hold-up, oil hold-up and gas hold-up.

There are numerous apparatus available for measuring this information. To measure the total flowrate, spinner flowmeters are generally used, in particular as described in copending applications Ser. No. 867,994 filed by Fierfort on Oct. 21, 1969, and now abandoned, and Ser. No. 872,971 filed by Bonnet on Oct. 31, 1969, now Pat. No. 3,630,078. To obtain the hold-up of each phase, one may for example measure the average density of the flowing fluid either by means of a differential pressure apparatus, called a gradiomanometer, of the type described in the U.S. Pat. No. 3,455,157 issued to Lahye et al. on July 15, 1969, or by means of a vibrating densimeter, in particular as described in the U.S. Pat. No. 3,225,588. It is also possible to obtain the composition of the flowing fluid by means of nuclear apparatus of the gamma ray emission type, or in certain cases by average capacitance measurements. Another known method is to combine two of the above sensors so as to obtain with a single apparatus the total flowrate and the hold-up of each phase.

It may be thought that, from these two quantities, it is simple to determine the relative flowrate of each phase. In fact, in a vertical rising flow, the phases have different velocities, the lighter phase flowing faster than the heavier phase. Consequently, the "cut" of the phase (i.e. the flowrate of each phase divided by the total flowrate) is different from the measured hold-up. In order to determine the flowrate of each phase, it is necessary to know another quantity, for example the slippage velocity, i.e. the difference in velocity between the two phases. It has hitherto been assumed that this slippage velocity is constant along the entire length of the well, and only a function of the density difference between the two phases. When making this assumption for high flowrates, it is possible to obtain reasonably accurate results due to the fact that the slippage velocity remains low in relation to total flow-rate for such high flow rates. On the other hand, in the case of low flow-rates, the above assumption leads to erroneous results.

It is therefore an object of the present invention to determine with reasonable accuracy the slippage velocity and/or the flowrate of individual phases in a multiple phasic flow for both high and low flow rates.

A further object of the invention is to provide an accurate representation of the nature and of the composition of the fluid produced at different levels of a well.

In accordance with one aspect of the present invention, a method of processing well logging data comprises deriving a measurement representative of the proportion of one phase of a multiple phase flow in a well at a selected depth level and using this derived measurement in conjunction with a predetermined value of the apparent difference in density between the two phases of the multiple phase flow to produce a representation of the difference in velocity between two phases of the multiple phase flow at the selected depth level.

In accordance with the another aspect of the present invention, a method of processing well logging data comprises deriving a measurement representative of the proportion of one phase of a multiple phase flow in a well at a selected depth level and deriving a measurement representative of the total rate of flow of the fluid in the well at the selected depth level. These derived measurements are combined to produce a representation of the flow rate of at least one phase of the multiple phase flow at the selected depth level. One of the constants used in producing the representation of flow rate is a predetermined value for the apparent density difference between the above mentioned two phases. This predetermined value can vary from one well to another, or perhaps even between horizons of one well.

The characteristics and advantages of the invention will be better understood through the description to follow given by way of non-limitative examples with reference to the accompanying drawings in which:

FIG. 5 is the diagram of circuits for the processing of data in accordance with the method of the invention;

FIG. 5A is a block diagram of a circuit of the FIG. 5;

Figure 1:
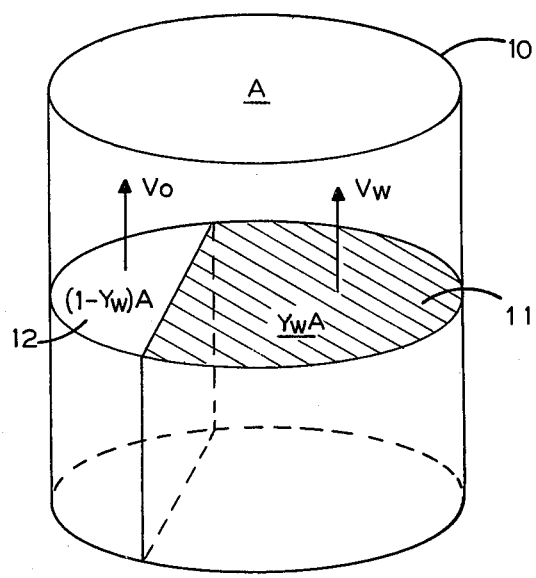
FIG. 1 is a simplified diagram of a diphasic flow in a producing well.

For a proper understanding of the invention, we shall first establish the equations relate relatte the different parameters of a diphasic flow. In this connection, referring to FIG. 1, a schematic representation is given of a section of a casing 10 of a producing well. In this casing flows a diphasic fluid produced by underground formations and including a heavy phase 11, for example water, and a light phase 12, for example oil. To permit the equations to be formulated, two separate phases are represented, flowing parallel to each other. In reality, the two phases are mixed, one of these phases generally being in the form of bubbles in suspension in the other phase which is called the continuous phase. If $Y_w$ is the water hold-up, i.e. the ratio between the volume of water in place and the total volume of the fluid, it can be seen that the water flow-rate $Q_w$ and the oil flowrate $Q_o$ are given by the equations:

$$Q_w = Y_w A V_w \qquad (1)$$

$$Q_o = (1-Y_w) A V_o \qquad (2)$$

in which A is the internal area of the cross-section of the casing and $V_w$ and $V_o$ are respective flowrates of the water phase and the oil phase.

Moreover, the total flowrate $Q_t$ is given by the equation:

$$Q_t = Q_w + Q_o \qquad (3)$$

If the quantitites of $Q_t$ and $Y_w$ can be obtained through measurements in the well, there are three equations with four unknowns, namely $Q_w$, $Q_o$, $V_w$ and $V_o$. To solve this system of equations, a fourth equation is needed, for example:

$$V_s = V_o - V_w \qquad (4)$$

in which $V_s$ is the slippage velocity between the two phases. If this slippage velocity can be determined, we can in fact solve the system of equations 1 to 4 to obtain $Q_w$ and $Q_o$ as follows:

$$Q_w = Y_w Q_t - Y_w(1-Y_w) A V_s \qquad (5)$$

$$Q_o = (1-Y_w) Q_t + Y_w(1-Y_w) A V_s \qquad (6)$$

As discussed earlier, it has in the past been assumed that the slippage velocity is constant along the length of the well and only a function of the density difference between the two phases. Thus, in the past, the density difference would be first determined from density measurements to enable a determination of a value of slippage velocity for the well. To determine this one shot value of slippage velocity for bubble flow, the following equation can be used for bubbles of diameter 0.1 cm to 2 cm:

$$V = K \left[ \frac{\sigma g \Delta \rho}{\rho_{liq}^2} \right]^{1/4}$$

where K is constant, $\sigma$ is the interfacial tension on the bubble surface, $\Delta \rho$ is the density difference between the bubble phase and containing fluid, $\rho_{liq}$ is the density of the containing fluid, $g$ is the acceleration of gravity. For more information on this expression, see the article entitled "Average Volumetric Concentration in Two-Phase Flow Systems" in Vol. 87 of the Journal of Heat Transfer by Zuber and Findley.

After finding the value of $V_s$, equations 5 and 6 could be solved for $Q_o$ and $Q_w$. However, after a great deal of research, it has been found that this assumption of one value of slippage velocity is not always correct. Recent laboratory research has shown that the slippage velocity $V_s$ is a function of both the water hold-up $Y_w$ and of certain physical properties of the phases such as their density, their viscosity, and the surface tension of the bubbles. More specifically, this research has found that the slippage velocity $V_s$ is given by the following expression:

$$V_s = 22.5 \sqrt[4]{\frac{\pi \Delta \rho' Y_w}{\rho_w^2}} \cdot \sqrt[3]{24(1-Y_w)} \qquad (7)$$

where $$\Delta \rho' = \Delta \rho \frac{\sigma}{35} \cdot \frac{1}{1 + 0.03 \log \mu_o} \qquad (8)$$

where $$\Delta \rho = \rho_w - \rho_o \qquad (9)$$

where $\rho_w$ is the density of water and $\rho_o$ is the density of oil.

As it is practically impossible to obtain the value of the surface tension, two possibilities exist for determining the parameter $\Delta \rho'$. One can measure the density difference $\Delta \rho$ in accordance with equation 9 at the surface and correct this measured value to take into account the temperature and pressure conditions at the considered depth. This corrected value can be used as the value of the parameter $\Delta \rho'$ with the understanding that average values for the interfacial tension $\sigma$ and the oil viscosity $\mu_o$ are being used. The other possibility is to determine the value of the parameter $\Delta \rho'$ from surface measurements of the total flowrate $Q_t$ and water flowrate $Q_w$, and also from a measurement of $Y_w$ made immediately above the production zone closest to the surface, this measurement $Y_w$ corresponding to the surface flow. From these values, $Q_t$, $Q_w$ and $Y_w$, one can determine the slippage velocity by using equation 5. By means of equation 7, knowing $Y_w$ and $V_s$, one can obtain the value of the parameter $\Delta \rho'$ applicable over the entire length of the well. This value, which includes the parameter $\Delta \rho$ (equation 8), takes into account the surface tension and the viscosity and probably will not be equal to the actual density difference $\Delta \rho$ between the phases.

Figure 2:
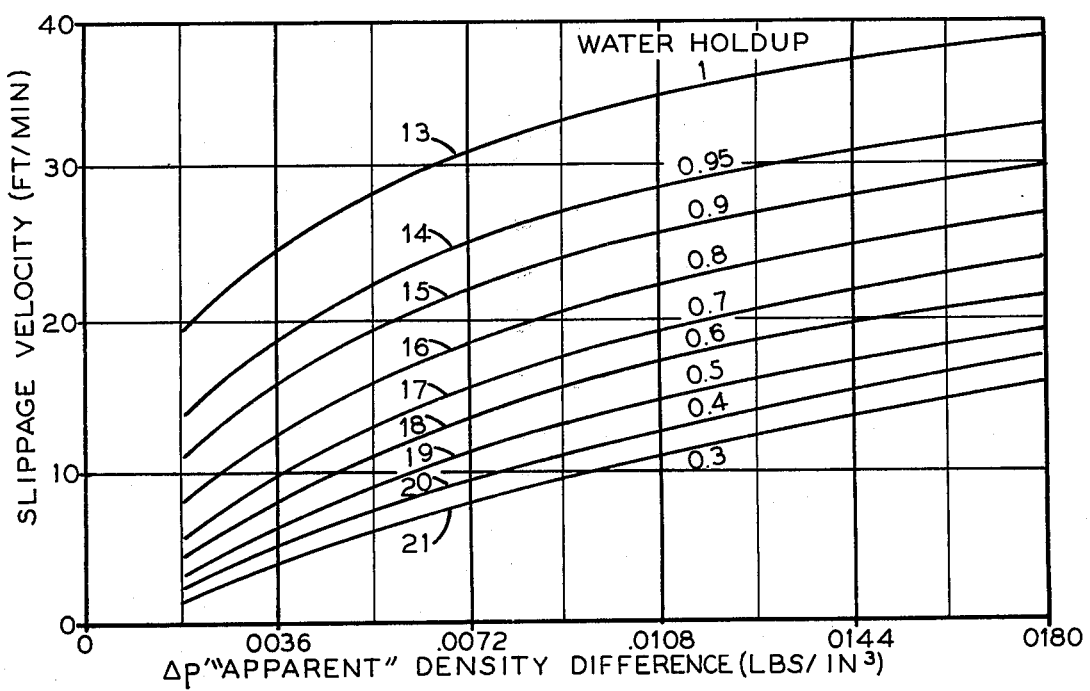
FIG. 2 is a plot of the slippage velocity versus the density difference between the two phases of a flowing fluid for different values of water hold-up.

FIG. 2 shows equations 7 to 9 in graphical form. In FIG. 2, a set of curves 13 to 21 has been plotted, each of which represents, for a given water hold-up, the slippage velocity $V_s$ as a function of the parameter $\Delta \rho'$ given in equation 8.

From FIG. 2, it is possible to make two observations. It can first of all be seen that the slippage velocity increases when the density difference increases. Moreover, it is seen that this slippage velocity increases when the water hold-up $Y_w$ increases. It was hitherto considered that the slippage velocity was constant along the entire length of a producing well, even when the water hold-up varied. The curves of FIG. 2 show that this prior method of interpretation gives erroneous results, especially for low flowrates in which the slippage velocity is relatively high compared with the average flowrate of the fluid.

It would perhaps be more useful to represent equation 7 by a plot of slippage velocity $V_s$ vs water hold-up $Y_w$ for different values of $\Delta\rho'$ since a value of $\Delta\rho'$ is selected before computing slippage velocity $V_s$ with measured values of water hold-up $Y_w$. Using the curves of FIG. 3 and having a predetermined value of $\Delta\rho'$ it is possible, in accordance with the present invention, to determine the slippage velocity $V_s$ with values of water hold-up $Y_w$ measured by a densimeter or a gradiomanometer. Once this magnitude $V_s$ has been obtained, it will be easy to determine the flowrates $Q_w$ and $Q_o$ by means of equations 5 and 6.

Figure 3:
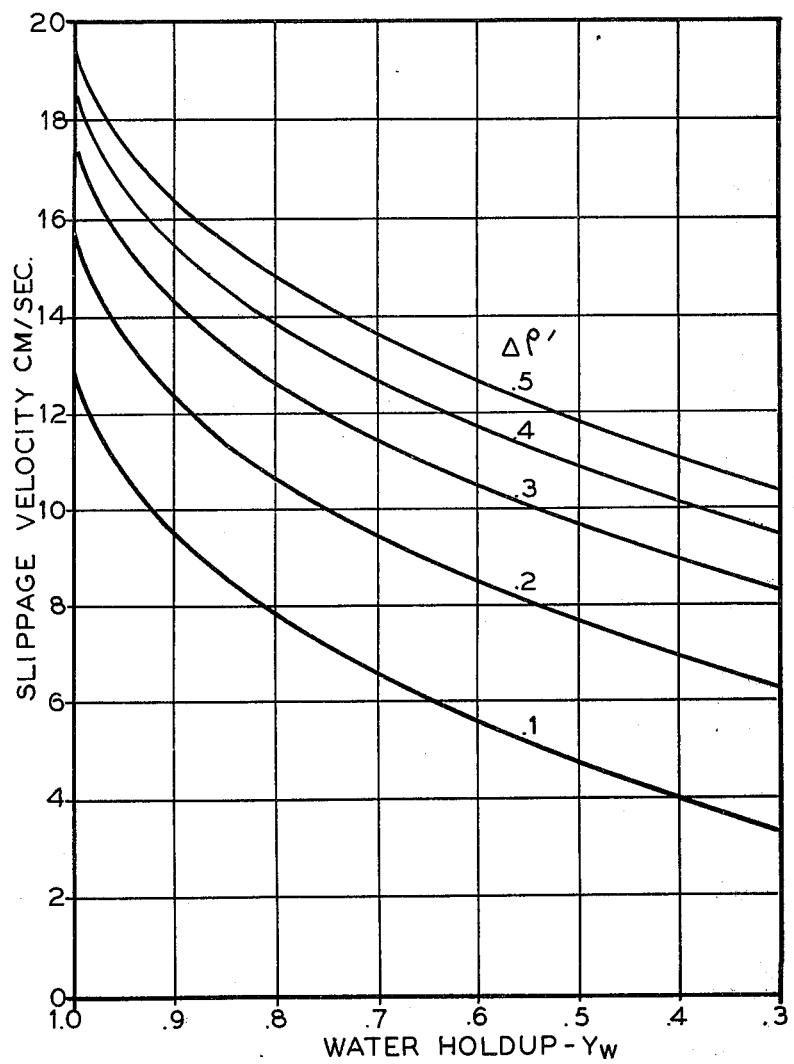
FIG. 3 is a plot of slippage velocity versus their density difference for different values of water hold-up.

Just as it is possible, from the curves of FIG. 3, to find the equation which relates the slippage velocity to the apparent density difference and to the water hold-up, one can also solve equations 5 and 6 graphically. In order for this graphical solution to be applicable to all well casings of any internal area A, a parameter V, called the "superficial velocity", and defined as the flow per unit area is used. This superficial velocity is then independent of the dimensions of the casing, and we have:

$$\overline{V}_t = Q_t/A \qquad (10)$$

$$\overline{V}_w = Q_w/A \qquad (11)$$

$$\overline{V}_o = Q_o/A \qquad (12)$$

where the subscripts $t$, $w$ and $o$ have the same meaning as before. Combining equations 10, 11 and 12 with equations 5 and 6, the superficial velocities of the water and oil are then given by the equations:

$$\overline{V}_w = Y_w \overline{V}_t - Y_w(1-Y_w)V_s \qquad (13)$$

$$\overline{V}_o = (1-Y_w) \overline{V}_t + Y_w(1-Y_w)V_s \qquad (14)$$

Figure 4:
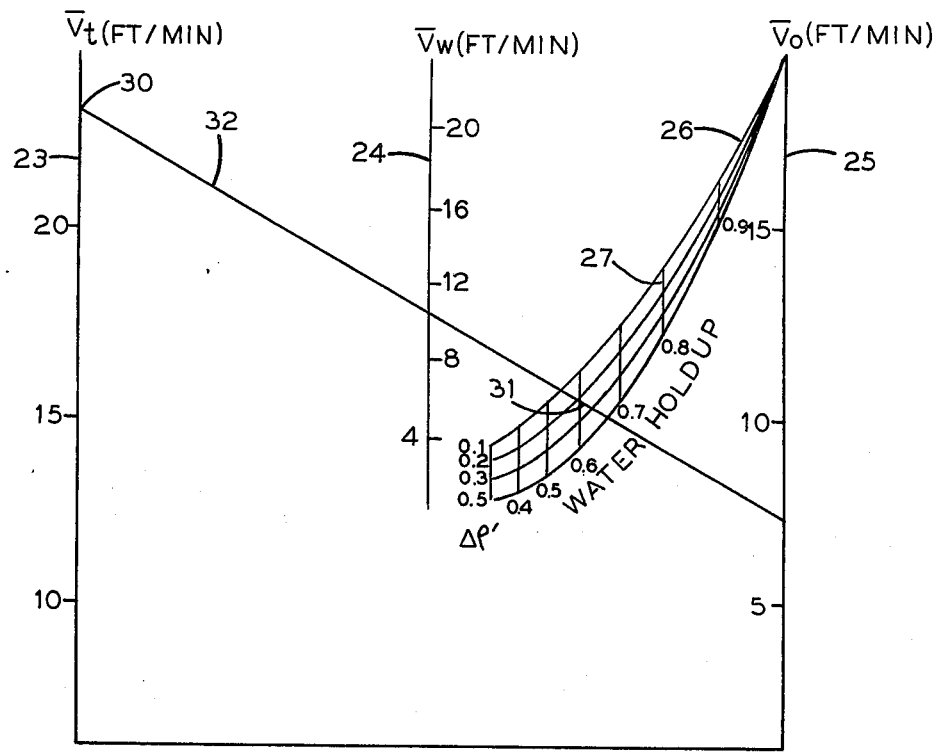
FIG. 4 is a chart giving a graphical solution of the method of the invention.

FIG. 4 represents an alignment chart permitting the graphical solution of the equations 13 and 14. This figure represents, from left to right, three axes, 23, 24 and 25, on which are located respectively the values $\overline{V}_t$, $\overline{V}_w$ and $\overline{V}_o$. A family of curves 26, corresponding to the different values of $\Delta\rho'$, is intersected by vertical lines 27 corresponding to the different values of the water hold-up $Y_w$. To each value of $\Delta\rho'$ there thus corresponds a curve of the family 26 and to each value of $Y_w$ a point on this curve. If the total superficial velocity $\overline{V}_t$ is known, we need only join this value, located on the axis 23 on the left, to the previously defined point of the curve of the family 26. This line intersects the axes 24 and 25 at two points which give respectively the sought values of $\overline{V}_w$ and $\overline{V}_o$.

Conversely, by means of the alignment chart of FIG. 4, it is possible to determine the value of the parameter $\Delta\rho'$ applicable over the entire length of the well if one knows the values of $\overline{V}_t$, $\overline{V}_w$ and $Y_w$ corresponding to the same flow. As the values $\overline{V}_t$ and $\overline{V}_w$ can be easily determined for the flow at the surface of the well, one need only carry out a measurement of $Y_w$ in the part of the casing located immediately over the perforations closest to the surface. The line joining the values $\overline{V}_t$ and $\overline{V}_w$ measured on the surface will intersect the vertical line of the abscissa $Y_w$ at a point defining a curve of the family 29 which corresponds to the sought value of $\Delta\rho'$.

From the foregoing, it can be seen that it is possible to determine at different depths the flowrate of the water and oil flowing in the well with oil bubbles in suspension in a continuous water phase. In simple cases, these values may be determined manually, either by calculation, or graphically, as indicated above. On the other hand, for more complex cases, it will be necessary to use automatic computation methods. The method of the invention may be perfectly adapted to automatic calculations performed by a computer for example. In fact, as all of the relationships between the different parameters are known, calculations may be carried out by means of electronic circuits adapted to automatically process signals representative of the total flowrate $Q_t$ and of the water hold-up $Y_w$.

FIG. 5 shows such circuits. In FIG. 5, a well tool 33 is supported in a cased well 34 by a cable 35. The well 34 is perforated at a plurality of points 36 such that formation fluid will enter the well at these points. The well tool 33 includes a spinner flowmeter and gradiomanometer to measure the total flowrate $Q_T$ and mixture density $\rho_M$ of the fluid. From $\rho_M$ the water hold-up $Y_w$ can be derived from the following expression:

$$Y_w = \frac{\rho_M - (\rho_o)_{BH}}{(\rho_w)_{BH} - (\rho_o)_{BH}} \qquad (15)$$

where $(\rho_o)_{BH}$ and $(\rho_w)_{BH}$ are predetermined values of bottom hole oil density and water density respectively.

The signals from the well tool 33 are applied to signal processing circuits 38 which perform a number of standard operations, such as impedance-matching, calibration correction, etc. The gradiomanometer signal $\rho_M$ is applied to a computing circuit 39 which computes the value of water hold-up $Y_w$. To accomplish this, a signal proportional to $(\rho_o)_{BH}$ derived from a potentiometer 41 is subtracted from the $\rho_M$ signal by a difference circuit 40 and the resulting signal multiplied by the constant $$\frac{1}{(\rho_w)_{BH} - (\rho_o)_{BH}}$$

through the action of a potentiometer 42 to produce $Y_w$.

This $Y_w$ signal as well as the total flowrate signal $Q_T$ are applied to a computer circuit 45 to compute $Q_w$ and $Q_o$. To accomplish this, the signals proportional to $Y_w$ and $Q_T$ are applied to a computer circuit 46 to which is also applied signals representative of the predetermined constants $\Delta\rho'$ and $\rho_w$. The circuit 46 delivers an output signal proportional to $V_s$ computed in accordance with equation 7. The signal $Y_w$ is also applied to a calculation circuit 47 adapted to deliver an output signal proportional to $Y_w(1 - Y_w)$. The circuits 46 and 47 are connected to the inputs of another calculation circuit 48 to which is applied the value of the area A so as to generate a signal representative of $Y_w(1 - Y_w)V_sA$. The signal $Y_w$ and a signal representative of $Q_t$ are also applied to a multiplication of circuit 49 whose output signal is proportional to $Y_wQ_t$. The outputs of the circuits 48 and 49 are connected to the input of a subtraction circuit 50 which gives the difference of these two input signals; that is, $Q_w = Y_w Q_t - Y_w(1-Y_w)V_s A$. The signal $Q_w$ and the signal $Q_t$ are applied to a recorder 51 whose movement is proportional to depth by virtue of a wheel 52 coupled to the cable 35 to rotate therewith and driving a mechanical linkage 53 coupled to the film drive of the recorder 51.

FIG. 5A shows how the $V_s$ computer 46 might be constructed. The measured quantity $Y_w$ and the predetermined constants $\Delta\rho'$ and $\rho_w$ are applied to a computation circuit 55 which computes $$\frac{\Delta\rho' Y_w}{\rho_w^2}.$$

The fourth root of this quantity is taken by a circuit 56, multiplied by 22.5 in a circuit 57. A circuit 58 computes $24(1-Y_w)$ and a circuit 59 takes the third root of this quantity. A difference circuit 60 is responsive to the output signals from circuits 57 and 59 to produce a signal proportional to $V_s$.

Figure 6:
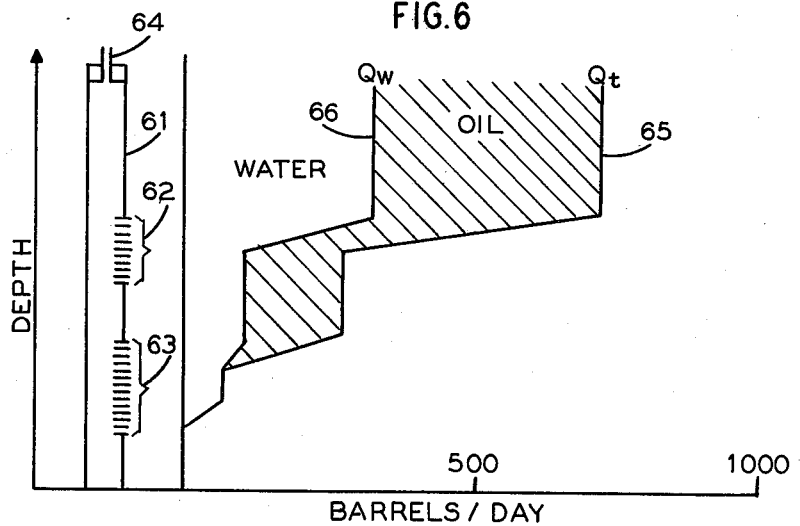
FIG. 6 is a form of presentation of the results obtained by the method of the present invention.

FIG. 6 represents a recording which may be given by the recorder 51. On the left part is a schematic representation of the production well consisting of a casing 61, perforated opposite two production zones 62 and 63. On the upper part of the casing 61 is fixed the lower end of a production string 64. To the right of this schematic representation there is a zone whose ordinate is graduated in depths and whose abscissa in flowrate units (Barrels/day, for example). In this zone a first curve 65 is shown representing the total flowrate $Q_t$, given for example by a spinner flowmeter. A second curve 66 represents the water flowrate $Q_w$ calculated in accordance with the method of the invention from the measurements of the flowmeter and a gradiomanometer for example. The zone located between the curves 65 and 66 thus represents the oil production of the well. By means of such curves, one immediately sees the nature and the composition of the fluid produced by each zone. Thus, for example, the zone 63 is composed of a lower part which produces only water, a middle part which does not produce any fluid and an upper part which produces both water and oil in the proportions of 20% water and 80% oil. These curves thus give precise quantitative information which is directly utilizable and which in particular makes it possible to determine the operations to be performed to improve the production and the efficiency of the well.

Figure 7:
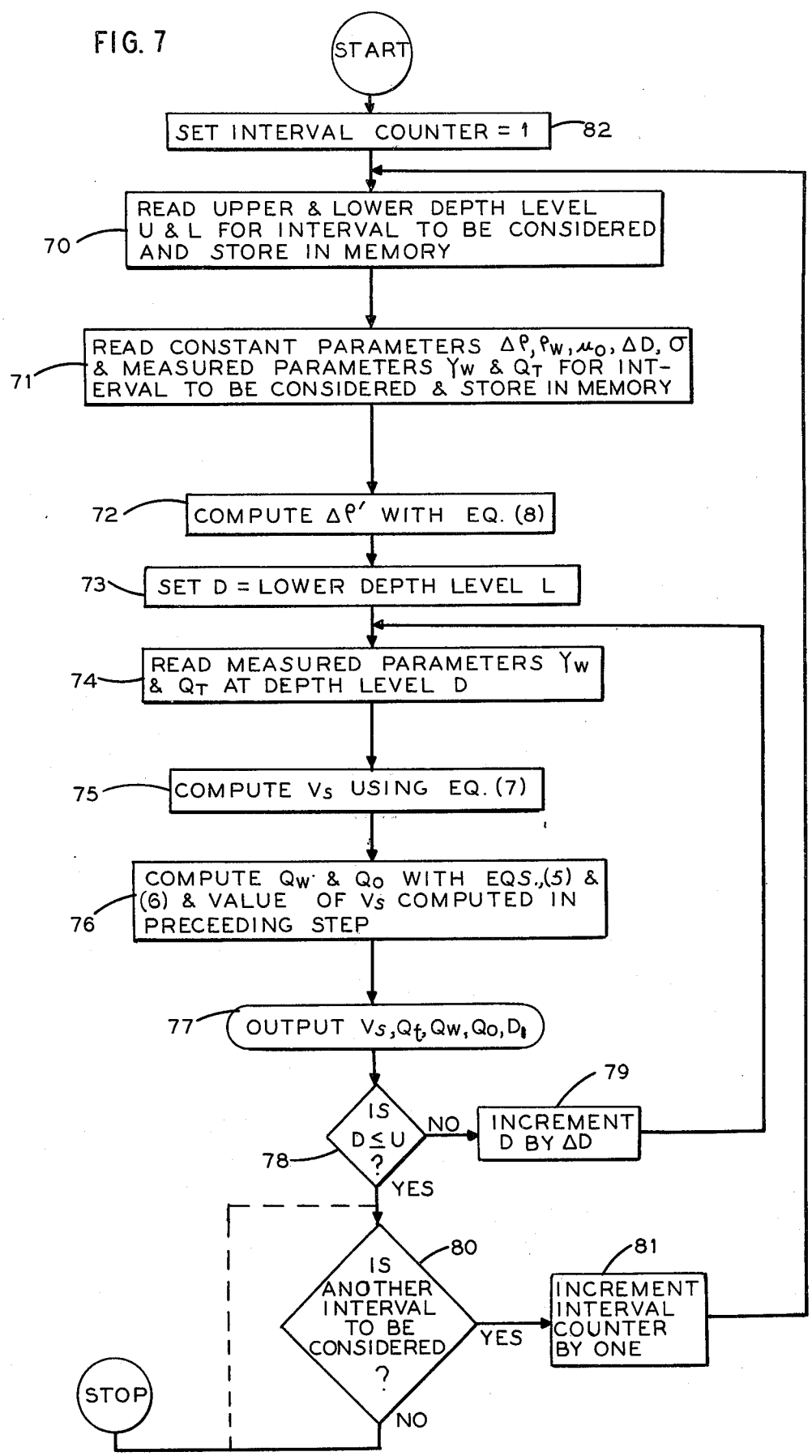
FIG. 7 is a flow diagram representation of a computer program for processing production logging data in accordance with the present invention.

Now turning to FIG. 7, there is shown a flow diagram representation of a computer program for practicing the method of the present invention. After the program "start", the numerical values in feet of the upper and lower depth levels U and L respectively of the interval for which data is to be processed are read and stored in memory as represented by block 70. Next, the constant parameters $\Delta\rho$, $\rho_w$, $\mu_o$, $\sigma$ and $\Delta D$ and the measured parameters $Y_w$ and $Q_T$ are read interval L to U, as represented by block 71. ($\Delta D$ is the interval between depth levels to be considered). Then, $\Delta\rho'$ is computed from equation 8 and D, the depth level presently under consideration, is set equal to L. (See blocks 72 and 73.) Next, the measured quantities $Y_w$ and $Q_T$ at the presently considered depth level D are read from memory and $V_s$ is computed in accordance with equation 7. (See blocks 74 and 75.) Then, $Q_w$ and $Q_o$ are computed using the value of $V_s$ computed in step 75 as well as the measured values of $Y_w$ and $Q_T$ at depth level D and all desired computations are outputted. (See elements 76 and 77.)

As represented by a decision element 78, it is determined if the last depth level of the interval to be considered has been reached and if not, D is incremented by $\Delta D$ (see element 79) and the program recycles to step 74 to consider the next depth level. If D is $\leq$ U, the program can, if desired, have facility to determine if another interval is to be considered. Otherwise, the program stops at this point, as represented by the dashed line connection between element 78 and element 80. If the program is to be able to consider other depth levels, an interval counter is needed. (See elements 81 and 82.)

Each of the steps of the detailed flow diagram of FIG. 7 is directly translatable to any one of a number of standard computer languages, such as P1/1, and can be performed on a conventional general purpose computer of a suitable size and a suitable configuration, such as an IBM 360/65 of conventional configuration.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of machine processing well logging data, comprising:
    deriving a measurement representative of the proportion of one phase of a multiple phase flow in a well at a selected depth level;
    deriving a measurement representative of the total rate of flow of the fluid in a well at said selected depth level; and
    combining with a machine said derived measurements with a predetermined value of the apparent difference in density between two phases of said multiple phase flow to produce a representation of the flow rate of at least one phase of said multiple phase flow at said selected depth level in a well.

2. The method of claim 1 wherein the step of combining includes combining said phase proportion measurement with said predetermined density difference value to compute a representation of the difference in velocity between said two phases, and combining said representation of velocity difference with said derived measurements to produce said flow rate representation.

3. A method of machine processing well logging data to determine in a two phase, water, oil flow through a conduit, the flow rate of at least one phase wherein a value of the apparent difference in density between said water and oil is predetermined before processing data, comprising:
    deriving a measurement representative of the proportion of one phase of said two phase flow in a well at a selected depth level;
    deriving a measurement representative of the total rate of flow of the fluid in a well at said selected depth level; and
    combining with a machine said derived measurements with said predetermined density difference value to produce a representation of the flow rate of at least one phase of said two phase flow at said selected depth level in a well.

4. The method of claim 3 wherein the step of combining includes combining said phase proportion measurement with said predetermined density difference value to compute a representation of the difference in velocity between said two phases, and combining said representation of velocity difference with said derived measurements to produce said flowrate representation.

5. The method of claim 4 wherein said phase proportion measurement is the proportion of water in said two phase flow.

6. The method of claim 5 wherein said water proportion measurement $Y_w$ is combined with said value of density difference $\Delta\rho'$ to produce said velocity difference representation $V_s$ in accordance with the expression:

$$V_s = X \sqrt[4]{\frac{\Delta\rho' Y_w}{\rho_w^2}} \sqrt[3]{Z(1-Y_w)}$$

where X and Z are constants and $\rho_w$ is a predetermined value of the density of water.

7. The method of claim 6 wherein said representation $V_s$ is combined with said flowrate measurement $Q_T$ and said water phase proportion measurement $Y_w$ to produce a representation of the flowrate $Q_w$ of said water phase in accordance with the expression:

$$Q_w = Y_w Q_T - Y_w(1-Y_w) A V_s$$

$$[Q_o = (1-Y_w)Q_T + Y_w(1-Y_w) A V_s]$$

where A is the internal area of the cross section of conduit through which said water oil passes, whereby the flowrate of said oil phase is represented by the difference between the measured total flowrate $Q_T$ and the produced flowrate $Q_w$.

8. A method of machine processing well logging data, comprising:
deriving a measurement representative of the proportion of one phase of a multiple phase flow in a well at a selected depth level;
combining in a machine said derived measurement in conjunction with a predetermined value of the apparent difference in density between two phases of said flow to produce a representation of the difference in velocity between said two phases of said multiple phase flow at said selected depth level in a well.

9. The method of claim 8 wherein said two phases are water and oil and said phase proportion measurement is the proportion of water in said two phase flow.

10. The method of claim 9 wherein said water proportion measurement $Y_w$ is combined with said value of apparent density difference $\Delta\rho'$ to produce said velocity difference representation $V_s$ in accordance with the expression:

$$V_s = X \sqrt[4]{\frac{\Delta\rho' Y_w}{\rho_w^2}} \sqrt[3]{Z(1-Y_w)}$$

where X and Z are constants and $\rho_w$ is a predetermined value of the density of water.

11. Apparatus for processing well logging data, comprising:

means for deriving a measurement representative of the proportion of one phase of a multiple phase flow in a well at a selected depth level;
means for deriving a measurement representative of the total rate of flow of the fluid in a well at said selected depth level; and
means for combining said derived measurements with a predetermined value of the apparent difference in density between two phases of said multiple phase flow to produce a representation of the flow rate of at least one phase of said multiple phase flow at said selected depth level in a well.

12. Apparatus as in claim 11 wherein the combining means include means for combining said phase proportion measurement with said predetermined density difference value to compute a representation of the difference in velocity between said two phases, and means for combing said representation of velocity difference with said derived measurements to produce said flow rate representation.

13. Apparatus for processing well logging data to determine in a two phase, water, oil flow through a conduit, the flow rate of at least one phase wherein a value of the apparent difference in density between said water and oil is predetermined before processing data, comprising:
means for deriving a measurement representative of the proportion of one phase of said two phase flow in a well at a selected depth level;
means for deriving a measurement representative of the total rate of flow of the fluid in a well at said selected depth level; and
means for combining said derived measurements with said predetermined density difference value to produce a representation of the flow rate of at least one phase of said two phase flow at said selected depth level in a well.

14. Apparatus as in claim 13 wherein the combining means include means for combining said phase proportion measurement with said predetermined density difference value to compute a representation of the difference in velocity between said two phases, and means for combining said representation of velocity difference with said derived measurements to produce said flowrate representation.

15. Apparatus as in claim 14 wherein said phase proportion measurement is the proportion of water in said two phase flow.

16. Apparatus as in claim 15 wherein said water proportion measurement $Y_w$ is combined with said value of density difference $\Delta\rho'$ to produce said velocity difference representation $V_s$ in accordance with the expression:

$$V_s = X \sqrt[4]{\frac{\Delta\rho' Y_w}{\rho_w^2}} \sqrt[3]{Z(1-Y_w)}$$

where X and Z are constants and $\rho_w$ is a predetermined value of the density of water.

17. Apparatus as in claim 16 wherein said representation $V_s$ is combined with said flowrate measurement $Q_T$ and said water phase proportion measurement $Y_w$ to produce a representation of the flowrate $Q_w$ of said water phase in accordance with the expression:

$$Q_w = Y_w Q_T - Y_w(1-Y_w)A\, V_s$$
$$[Q_o = (1-Y_w)Q_T - Y_w(1-Y_w)A\, V_s]$$

where A is the internal area of the cross section of conduit through which said water-oil flow passes, whereby the flowrate of said oil phase is represented by the difference between the measured total flowrate $Q_T$ and the produced flowrate $Q_w$.

18. Apparatus for processing well logging data, comprising:

means for deriving a measurement representative of the proportion of one phase of a multiple phase flow in a well at a selected depth level; and means for utilizing said derived measurement in conjunction with a predetermined value of the apparent difference in density between two phases of said flow to produce a representation of the difference in velocity between said two phases of said multiple phase flow at said selected depth level in a well.

19. Apparatus as in claim 18 wherein two phases are water and oil and said phase proportion measurement is the proportion of water in said two phase flow.

20. Apparatus as in claim 19 wherein said water proportion measurement is $Y_w$ is combined with said value of apparent density difference $\Delta\rho'$ to produce said velocity of difference representation $V_s$ in accordance with the expression:

$$V_s = X \sqrt[4]{\frac{\Delta\rho'\, Y_w}{\rho_w{}^2}} - \sqrt[3]{Z(1-Y_w)}$$

where X and Z are constants and $\rho_w$ is a predetermined value of the density of water.

* * * * *

UNITED STATES PATENT AND TRADEMARK OFFICE
CERTIFICATE OF CORRECTION

PATENT NO. : 3,909,603
DATED : September 30, 1975
INVENTOR(S) : Yves Nicolas

It is certified that error appears in the above-identified patent and that said Letters Patent are hereby corrected as shown below:

Col. 2, line 62, "relatte", should read -- relate --.

Col. 5, line 20, "parameter V, " should read -- parameter $\overline{V}$ --.

Col. 9, line 33, equation "$[Q_o = (1-Y_w)Q_T + Y_w(1-Y_w)A V_s]$", should be deleted.

Col. 12, line 7, "is" after the word "measurement" should be deleted.

*Signed and Sealed this*

*thirteenth* Day of *April 1976*

[SEAL]

Attest:

RUTH C. MASON
*Attesting Officer*

C. MARSHALL DANN
*Commissioner of Patents and Trademarks*